United States Patent [19]

Inoue et al.

[11] Patent Number: 4,852,021

[45] Date of Patent: Jul. 25, 1989

[54] CENTRALIZED COMMAND TRANSFER CONTROL SYSTEM FOR CONNECTING PROCESSORS WHICH INDEPENDENTLY SEND AND RECEIVE COMMANDS

[75] Inventors: Aiichiro Inoue, Hiratsuka; Katsumi Onishi, Kawagoe; Yuji Oinaga, Tokyo; Kenichi Nojima, Yokohama, all of Japan

[73] Assignee: Fujitsu Limited, Kawasaki, Japan

[21] Appl. No.: 198,659

[22] Filed: May 19, 1988

Related U.S. Application Data

[63] Continuation of Ser. No. 748,344, Jun. 24, 1985.

[30] Foreign Application Priority Data

Jun. 29, 1984 [JP] Japan .................. 59-135414

[51] Int. Cl.[4] .................. G06F 13/00; G06F 15/16
[52] U.S. Cl. .................. 364/200; 364/228.3; 364/229.1; 364/238.2; 364/230
[58] Field of Search ... 364/200 MS File, 900 MS File

[56] References Cited

U.S. PATENT DOCUMENTS

| | | | |
|---|---|---|---|
| 3,909,782 | 9/1975 | Mazier | 364/900 |
| 4,177,514 | 12/1979 | Rupp | 364/200 |
| 4,253,146 | 2/1981 | Bellamy et al. | 364/200 |
| 4,290,106 | 9/1981 | Catiller et al. | 364/200 |
| 4,315,310 | 2/1982 | Bayliss et al. | 364/200 |
| 4,317,168 | 2/1982 | Messina et al. | 364/200 |
| 4,332,010 | 5/1982 | Messina et al. | 364/200 |
| 4,409,656 | 10/1983 | Anderson et al. | 364/200 |
| 4,451,827 | 5/1984 | Kahn et al. | 370/60 |
| 4,503,497 | 3/1985 | Krygowski et al. | 364/200 |
| 4,561,090 | 12/1985 | Turner | 370/60 |
| 4,573,044 | 2/1986 | McConachie et al. | 340/825.05 |
| 4,751,697 | 6/1988 | Hunter et al. | 370/86 |
| 4,783,730 | 11/1988 | Fischer | 364/200 |

*Primary Examiner*—Archie E. Williams, Jr.
*Assistant Examiner*—Eric Coleman
*Attorney, Agent, or Firm*—Staas & Halsey

[57] ABSTRACT

A system for controlling the transfer of commands between processors of a multiprocessor system, including a single control unit connected to all the processors by separate information transfer lines. The control unit selects the processor generating a command transfer request signal in a predetermined priority order and receives the processor address from the selected processor. The receiving processor and predetermined transfer information are determined in accordance with the selected processor, the processor address, and the processor status information determined by the processor address. The predetermined transfer information is transferred to the receiving processor via an information transfer path established between the selected processor and the receiving processor.

6 Claims, 8 Drawing Sheets

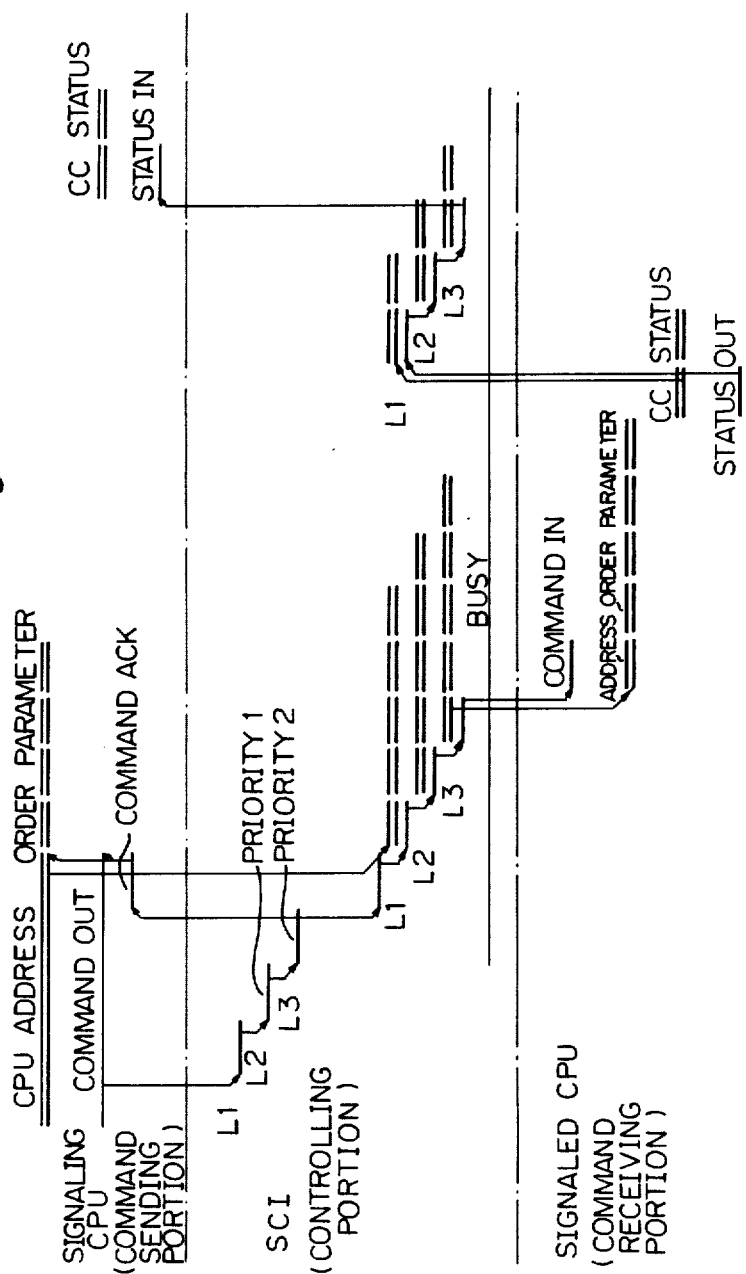

Fig. 7a  CPU ADDRESS
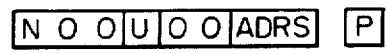
U: IMPROPER CPU ADDRESS
N: NOT OPERATIONAL
Fig. 7b  ORDER
I: INVALID ORDER
A: ADDRESSING
Fig. 7c  PARAMETER
Fig. 7d  C C
Fig. 7e  STATUS
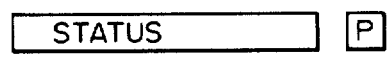

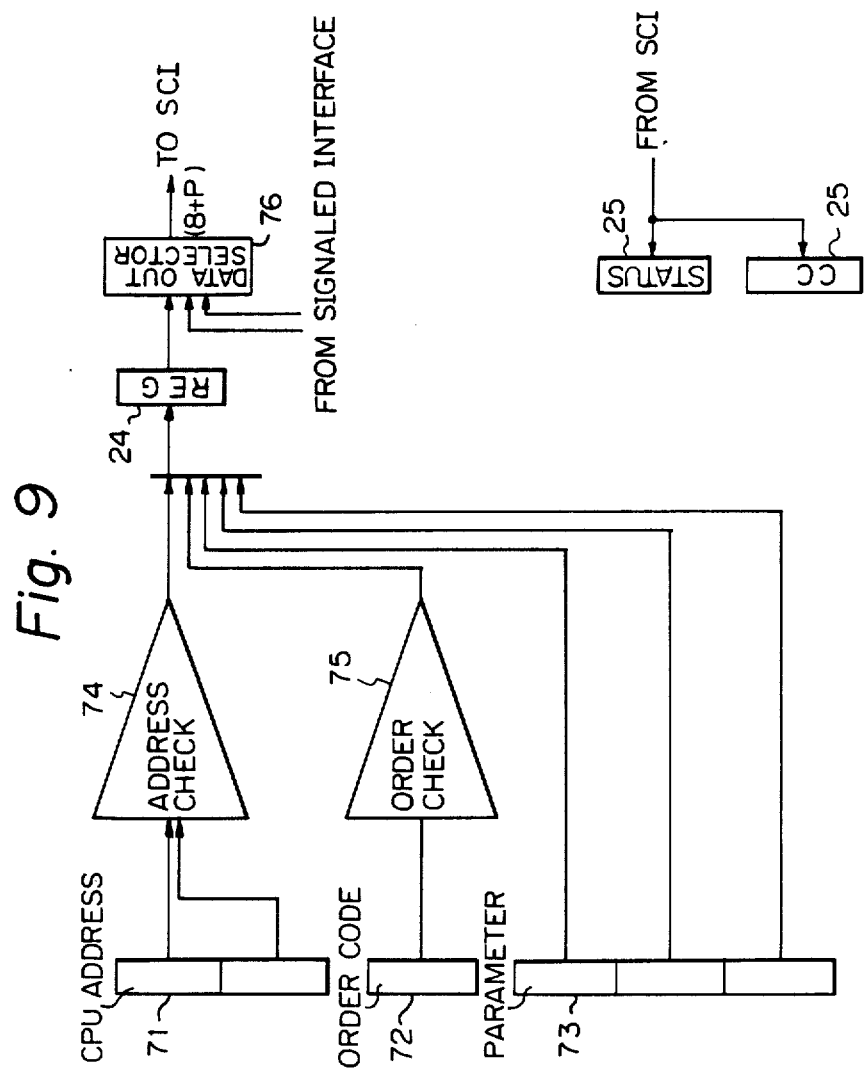

CENTRALIZED COMMAND TRANSFER CONTROL SYSTEM FOR CONNECTING PROCESSORS WHICH INDEPENDENTLY SEND AND RECEIVE COMMANDS

This is a continuation of co-pending application Ser. No. 748,344 filed June 24, 1985.

BACKGROUND OF THE INVENTION

1. Field of the Invention

The present invention relates to a computer system having a multiprocessor construction, more particularly to a system for controlling the transfer of commands between processors in a multiprocessor system.

2. Description of the Related Art

One of the major methods for forming a computer system is to tie in a plurality of central processors, input-/output processors, and the like to a common main memory unit. Such a system is called a multiprocessor system.

Such a multiprocessor system requires means for compulsory synchronization of the control operation between processors or the ability to directly transmit command information and response information therefor between processors for the control of startup at the start of system operation, control by one processor over the initialization, start, stop, etc. of another processor when the other processor is malfunctioning, etc.

For example, the central processors in multiprocessor systems are subject to what are called "signal processor commands", by which they transfer commands to other processors for the above-mentioned purpose. When executing such a command, they transfer command codes and parameters specified by the command to a designated processor and receive response information therefrom.

The response information includes the state of receipt of the commands and, when the commands are not received, information allowing determination of the state of the specified processor.

Further, when a desired kind of command is executed, information summarizing the results of executing, etc. is set as a condition code. The condition code of a signal processor command is mainly formed based on the above-mentioned response information.

For such transfer of information between processors, conventional systems, have been provided with information transfer paths (wires) directly connecting the processors for every combination of two processors.

Most conventional multiprocessor systems consist of two central processors. Advances in electronics technology, however, have made an increased number of the central processors more practical. A multiprocessor system having an increased number of processors should preferably be controlled by a method different from the conventional method and which different method is appropriate for information transfer between a large number of processors for communication of common information between the processors.

That is, in a method for control of a conventional system, the number of the information transfer lines increases in proportion to the square of the number of the processors and the scale of the control circuit provided in each processor increases in proportion to the number of the processors. Therefore, the scale of the overall system increases in proportion to the square of the number of the processors. This causes problems in economy and reliability.

SUMMARY OF THE INVENTION

An object of the present invention is to provide a novel system for controlling the transfer of commands between processors in a multiprocessor system by which the above-mentioned drawbacks can be eliminated.

This object can be achieved, according to the present invention, by a system for controlling the transfer of commands between processors including a single control unit connected to all the processors by separate information transfer paths; the control unit including means for selecting, in a predetermined priority order, the processor generating a command transfer request signal; means for receiving a processor address from the selected processor; means for determining the receiving processor and predetermined transfer information based on the selected processor, the processor address, and processor status information determined by the processor address; means for transferring the predetermined transfer information to the receiving processor; and means for establishing an information transfer path between the selected processor and the receiving processor.

Further features and advantages of the present invention will be apparent from the ensuring description with reference to the accompanying drawings to which, however, the scope of the invention is in no way limited.

BRIEF DESCRIPTION OF THE DRAWINGS

FIG. 6 is a time chart of the operation of the control unit shown in FIG. 5;

FIG. 7a to 7e are a diagrams of formats of the instruction used in FIG. 6;

FIG. 9 is a block diagram of one embodiment of the command sending portion.

DESCRIPTION OF THE PREFERRED EMBODIMENTS

Figure 1:
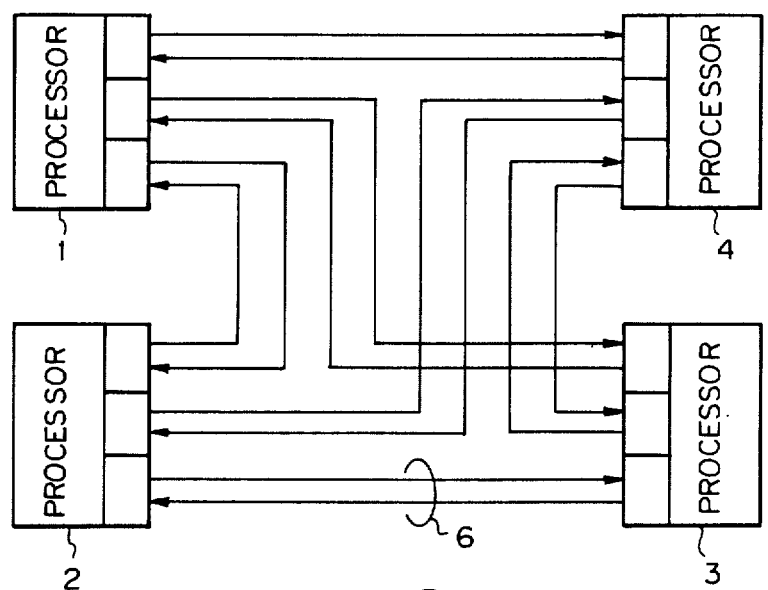
FIG. 1 is a diagram of one example of a conventional system.

FIG. 1 is a block diagram of one example of a conventional system.

In FIG. 1, 1 to 4 are processors. As typically shown by reference numeral 6, a pair of information transfer paths is provided between every pair of combination of two processors. Therefore, six pairs of the information transfers paths are required. Further, each processor requires the same number of information transfer interfaces. In addition, for the purpose of controlling the transfer of commands, each processor should be provided with a control circuit for judging the state of the other three processors and with lines for showing this state.

Figure 2:
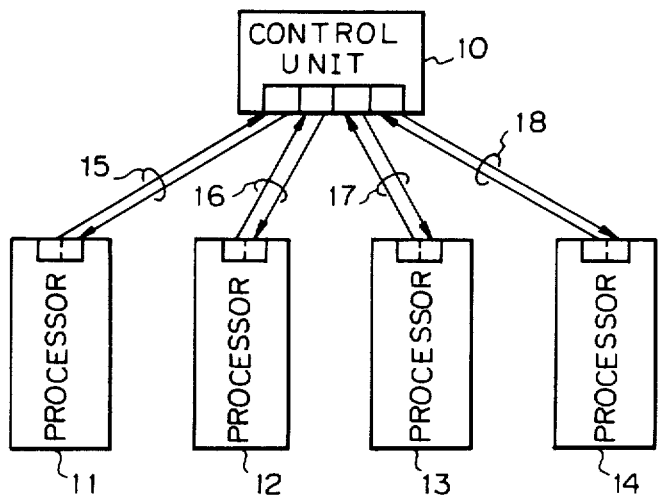
FIG. 2 is diagram of the system construction of an embodiment of the present invention.

FIG. 2 shows the system construction of an embodiment of the present invention. In the drawing, a control unit 10 functions to control communication between four processors 11 to 14. The processors 11 to 14 are separately connected to the control unit 10 by pairs of information transfer paths 15 to 18.

Figure 3:
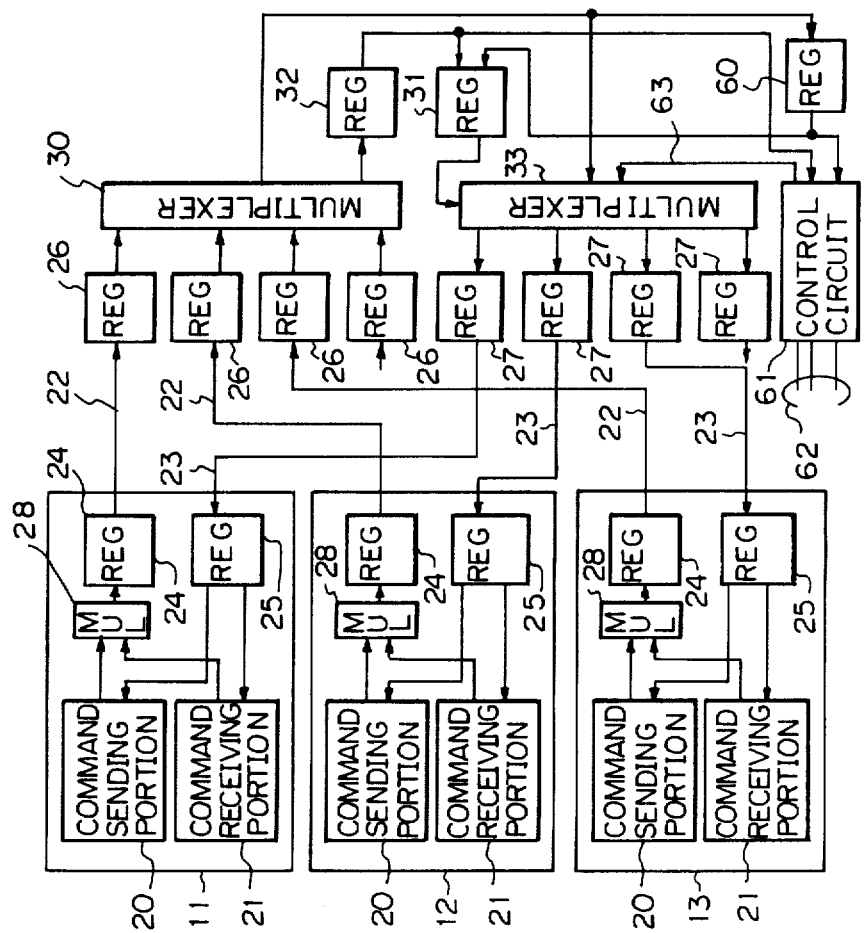
FIG. 3 is a block diagram of the control unit and processors of an embodiment of the present invention.

FIG. 3 is a block diagram of an embodiment of the control unit 10 and processors. As shown in the figure, each processor 11 to 14 is provided with a command sending portion 20. When a processor is to execute the above command, the command sending portion 20 generates command information based on the command and receives response information for processing. Each processor 11 to 14 is also provided with a command receiving portion 21. When a processor is to receive commands, the command receiving portion 21 receives and processes the command information and generates response information.

Information transfer paths 22 and 23 connect each of the processors 11 to 14 to the control unit 10. These paths carry information between the command sending portion 20 and command receiving portion 21, and the controller 10, respectively. Alternatively, a single bi-directional information transfer path may be provided for the command sending portion 20 and the command receiving portion 21 for common use.

Registers 24 and 25 are provided in each of the processors 11 to 14 and a corresponding number of registers 26 and 27 in the control unit 10 corresponding to the transfer paths 22 and 23. The sending side register 24 is connected to the command sending portion 20 by a multiplexer 28 when the command receiving portion 21 is not transferring information. The receiving side register 25 is always connected to the command sending portion 20 and the command receiving portion 21, the received information being used as valid information by one of the same depending on the content thereof.

Below, the invention will be explained in more detail by referring to a case wherein command information is transferred from the processor 11 to the processor 13 due to execution of a signal processor command in the processor 11, response information therefore being sent from the processor 13 to the processor 11.

When the processor 11 begins executing the signal processor command, its command sending portion 20 forms, by a well known method, the receiving processor address (address of processor 13) of the command receiving side, a command code, and parameters from the operand based on the specifications of the command.

The command sending portion 20 loads the receiving processor address into the register 24. At the same time, it loads the command transfer request bit in the register 24 and transfers the information in the register 24 to the register 26 in the control unit 10.

In the control unit 10, a multiplexer 30 is used to select the one of the registers 26 corresponding to the processors in which the command transfer request bit is on based on a suitable priority order. The receiving processor address in the register 26 is transferred to the register 60 and held therein. At the same time, the sending processor address of the sending processor 11 determined by the terminal selected by the multiplexer 30 is held in the register 32.

The address of the receiving processor of in the register 60 is supplied to a control circuit 61, where the appropriateness of the address is examined. The concept of improper addresses will be explained later. In any case, when the receiving processor address is proper (the processor addressed exists in this system), the selection signal corresponding to the processor address in the register selection 60 is selected from the signals indicating the switching state of the source or control state in the processors, indicated as the signal group 62. Using the selection signals, the specified receiving processor determines whether the command can be received.

When receivable, the processor address in the register 60 is transferred to the register 31. The multiplexer 33 is controlled by the content of the register 31 and functions to connect the bus 34 in the control unit to one of the registers 27 corresponding to the processors 11 to 14. The information transfer path to the specified receiving processor is determined in this way.

The control circuit 61 transfers the sending processor address in the register 32 to the signal line 63 and sends the same via the register 27 to the receiving processor (in this example processor 13).

When it is determined that the receiving processor address in the register 60 is proper, but the receiving processor is in a state where it cannot receive the command at that time, the control circuit 61 exercises control so as to transfer the sending processor address in the register 32 to the register 31 and connect the multiplexer 33 to the sending processor (11). Also, at this time, the control circuit 61 generates, based on the signal of the signal line group 62, a processor address which is not proper for the state and transfers the improper address from the signal line 63 via the register 27 to the register 25 in the sending processor 11 and indicates to the sending processor the data cannot be transferred because of some problem in the receiving processor.

When there is an improper processor address in the register 60 sent by sending processor 11 which addresses a processor not in the system, this means an improper processor address was forcibly generated in the sending processor 11. That is, for example, the sending processor 11 examines whether the processor address formed by the operand of the signal processor command is a processor address in the system. When it does not exist in the system, the sending process 11 forcibly generates the improper processor address. If the maximum number of processors connectable to the system is four, the improper processor address can be formed as an address having one "1" bit in a position higher than the lower 2 bits in the binary coded notation. Further, if necessary, special meaning may be given to the position of above-mentioned "1" bit, e.g., the indication of a specific state.

When there is an improper processor address in the register 60, just as when the specified processor cannot receive the command, the control circuit 61 connects the multiplexer 33 to the sending processor 11. However, the content of the register 60 is sent as is from the signal line 63 thus, indicating a sending processor error.

As discussed above, when the receiving processor and the predetermined transfer information are determined, signal lines (not shown) of the processors are used for transmission of a command input signal to the receiving processor 13 and a command valid signal to the sending processor 11. An information transfer path is thus secured from the sending processor 11 to the receiving processor 13. At the same time, the transfer information of the register 27 is transferred via the register 25 in the receiving processor 13 to the command receiving portion 21.

When the command receiving portion 20 in the sending processor 11 receives the above-mentioned command valid signal, it successively sends the command code, parameters, etc. via the register 24, the register 26, the multiplexer 30, the multiplexer 33, the register 27, and the register 25 in the receiving processor 13 to the command receiving portion 21. The command receiving portion 21 in the receiving processor 13 receives, by receipt of the command input signal mentioned above, the above-mentioned transfer information, transferred at the same time, and the command code, parameters, etc. transferred successively from the sending processor 11.

Further, as mentioned above, sometimes the receiving processor is the same processor as the sending processor. In such a case, the exact same information transfer as mentioned above is carried out between the command sending portion 20 and the command receiving portion 21, constructed to operate independently in the same processor, of the processor 11, which is commonly used as the sending and receiving processor.

In the receiving processor 13 (which is the same as for processor 11 used as receiving processor, no special explanation is made below), when the command receiving portion 21 receives, via the registers 25, the processor address together with the command input signal, the portion 21 recognizes, based on the processor address, that the command is issued from, for example, the processor 11, and receives the following command information.

Figure 4:
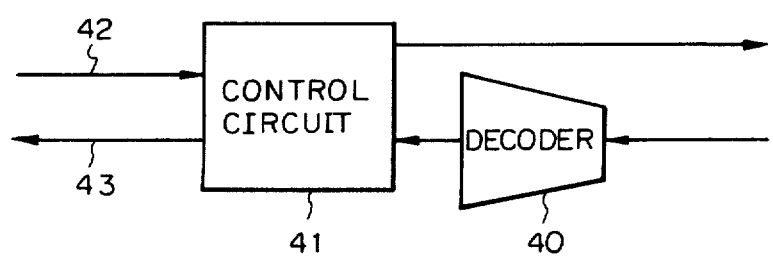
FIG. 4 is a block diagram of a command receiving portion.

The command receiving portion 21 in the receiving processor 13 has, for example, the construction shown in FIG. 4. It decodes the command code from the register 25 using a decoder 40 and sends the same to the control circuit 41.

The control circuit 41 determines, based on the kind of command and the state of the processor 13 read from the signal line 42, whether the command can be received and forms status information denoting the results thereof, etc.

Further, by the above-mentioned process, when it is determined that the command can be received, the command information is supplied to the processor by the signal line 43. As a result, control in accordance with the command is carried out, and, in accordance with the content of the command, generation of a hold on interruptions, initialization of the processor, and other control commences.

In the above-mentioned process in the control circuit 41, at the same time that the status information is created, the condition code is created as information summarizing the status information. For example, such information concerning, for example, whether the command is received in the state where it executed normally, whether status information indicating an abnormal state is received as the response information, etc. is loaded.

When the command receiving portion 21 of the processor 13 on the command receiving side creates response information formed according to the above-mentioned process from the status information and the condition code, it switches the multiplexer 28 to connect the register 24 to the command receiving portion 21 and loads the response information into the register 24. Further, it sets the response information transfer request bit of the register 24 and transfers the information to the register 26 in the control unit 10.

When the register 26 in the control unit 10 receives the response information transfer request bit, the multiplexer 30 is switched so as to receive input from the receiving processor 13. Further, the multiplexer 33 is switched for output to the sending processor 11 by the processor address in the register 32.

By the process mentioned above, the response information loaded in the register 24 in the processor 13 is received by the command sending portion 20 via the registers 26 and 27, and the register 25 in the processor 11.

When the command receiving portion 21 in the processor 13 sends the response information, the portion 21 returns the register 24 to connection to the command sending portion 20 and resets the state to enable execution of a new signal processor instruction.

When the control unit 10 detects, by timing, the termination of the transfer of response information having a predetermined length, the control unit 10 recognizes the termination of a series of the communications commenced in the processor 11 and resets the state to enable receipt of a new transfer request.

Along with the completion of the above-mentioned sequence of operations command transfer requests from processors previously not selected in the command transfer are accepted in a predetermined priority order when the command transfer request bits of the corresponding registers 26 are on.

In the command receiving portion 21, when the first received processor address is an improper processor address as mentioned above (in this case, the receiving processor becomes the same as the sending processor), the command receiving portion 21 refers also to the upper "1" bit of the address and generates status information and a condition code.

The means and method of information transfer control mentioned above enables processing in the case where a nonexistent processor address is designated, in the case where the receiving processor cannot receive the command due to a power cut, etc., and other abnormal cases by exactly the same control sequence as when the receiving processor normally sends response information. This simplified the control in the command transfer control system.

Figure 5:
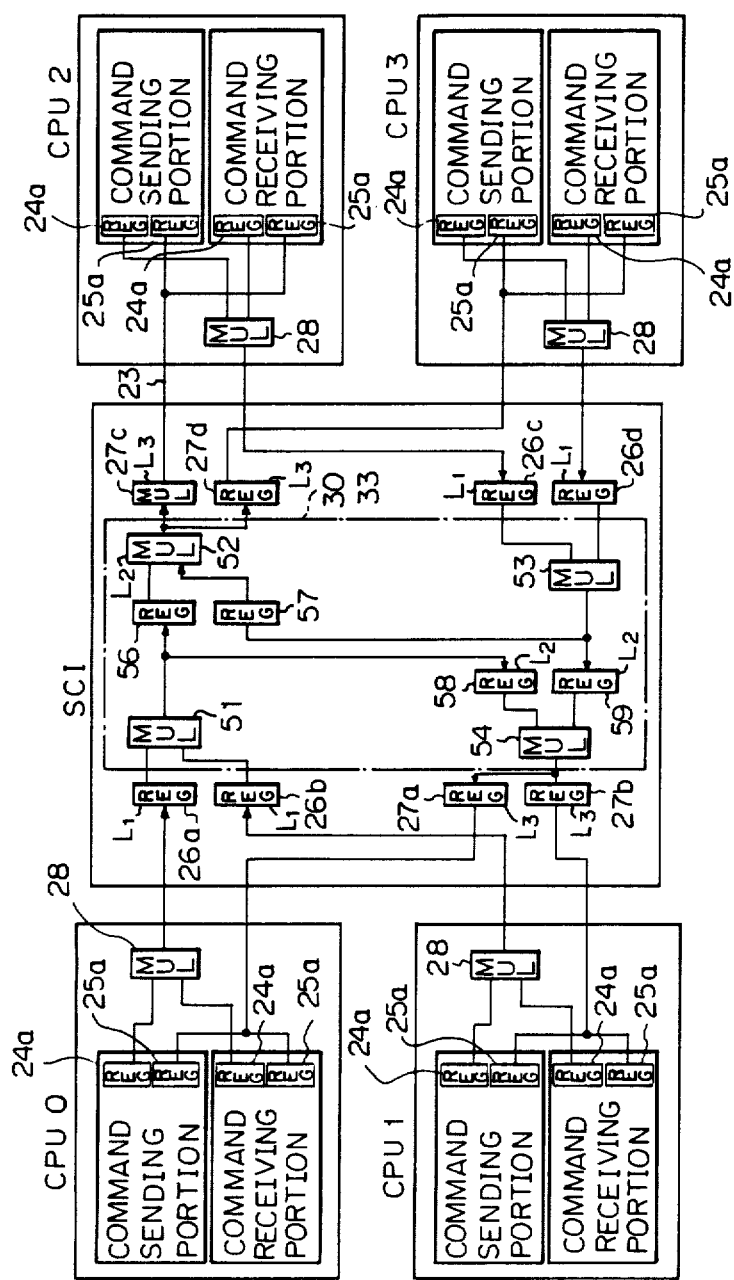
FIG. 5 is a block diagram of the control unit of another embodiment of the present invention.

The second embodiment of the present invention is shown in FIG. 5. In FIG. 5, elements the same as in FIG. 2 are shown by the same reference numerals. Reference numerals 24a, 24b; 25a, 25b; 26a, 26b 26c, 26d; 27a, 27b, 27c, 27d; correspond to 24, 25, 26, 27 in FIG. 2, respectively. The signals in line 22 (from the central processor to the system control interface) include the following:

| DATA OUT (0 to 7, P . . . parity) COMMAND OUT STATUS OUT | 11 lines |
|---|---|

The signals in line 23 (from SCI to CPU) include the following:

| DATA IN (0 to 7, P . . . parity) COMMAND IN STATUS IN COMMAND ACK | 12 lines |
|---|---|

FIG. 6 is a timing chart explaining the signal flow in the circuit shown in FIG. 5. FIG. 7 shows the construction of the signals in FIG. 6, that is, CPU.ADDRESS, ORDER, PARAMETER, CC (Condition Code), and STATUS.

In FIG. 6, a command out signal is generated from, for example, the central processor 0. The command out signal is supplied via the register 26a, a multiplexer 51, a register 56, and a multiplexer 52, or via the register 26a, a multiplexer 51, a register 58, and a multiplexer 54, to another central processor which is addressed by the central processor 0. When the COMMAND ACK signal is fed back to the central processor 0, the ORDER and PARAMETER shown in FIGS. 7 (b) and (c) are supplied to the address central processor 0, via the system control interface.

When the receiving side receives ADDRESS, ORDER, PARAMETER from the sending portion, the receiving side determines whether the received information can be accepted and forms the condition code CC. The condition code CC and the response information transfer bit is transferred to the sending portion.

Figure 8:
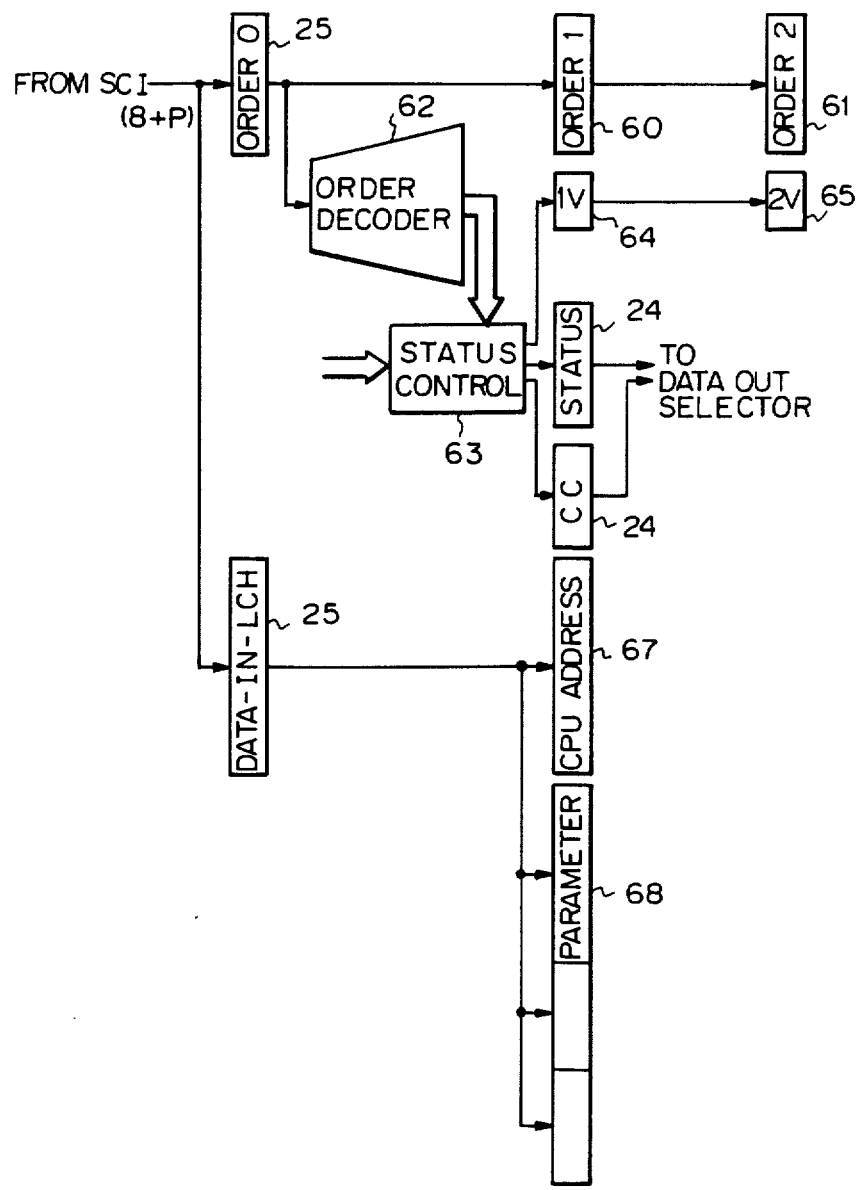
FIG. 8 is a block diagram of one embodiment of the command receiving portion.

FIGS. 8 and 9 are block diagrams of the sending portion, respectively and the receiving portion. Reference numerals the same as in FIG. 2 designate the same elements.

In FIG. 8, the information received from the system control interface is stored in the order part of register 25, the register 60, and the register 61. The output of the register 25 is decoded in the decoder 62 and supplied to a status control unit. In the status control unit, in accordance with a first valid circuit 64 or a second valid circuit 65, the CC and STATUS information is supplied to a data-out selector. On the other hand, the received data is stored via a data-in latch register circuit part of register 25 into to registers 67 and 68.

In FIG. 9, the sending portion stores CPV ADDRESS, ORDER CODE, and PARAMETER in the registers 71, 72, and 73 respectively. The stored data is selected by an address check circuit 74 and an order check circuit 75, and the data is output to the system control interface via the register 24 and a data output selector 76. The data received from the system control interface is stored in the CC and status portion of registers 25.

As mentioned in detail above, the processors are each provided with a single separate set of information transfer paths linking them to a single control unit. The control unit, based on the request of a sending processor, controls the transfer of desired information from the transfer origin to the receiving processor.

Further, the control unit is provided with means for deciding on or determining the receiving processor and the predetermined transfer information based on the selected processor on the command sending side, the receiving processor address for the receiving side specified by the sending processor, and processor status information determined by the receiving processor address. Therefore, each processor need not judge the state of the receiving processor, which dynamically changes when the command is sent.

The processor status information includes information on whether a processor is separated from the system by the control, if not separated, whether the power is on, and other information allowing determination of the possibility of command receipt and execution.

The above-mentioned means, in a normal command transfer, assumes the processor having the specified address to be the receiving processor and sends the sending processor address thereto as transfer information. If the processor having the specified address is in a state where it cannot receive the command, e.g., the power is off, a predetermined processor with other than the specified address, for example, the sending processor itself, is assumed as the receiving processor, and the information corresponding to the abnormal state is sent as the transfer information.

By such control means, abnormal command transfer and processing can be performed by the same sequence as normal command transfer and processing.

As is clear from the above, the present invention has considerable advantageous industrial effects, i.e., improved reliability and economy of command transfer control between processors in a multiprocessor system.

We claim:

1. A system for controlling transfer of commands between processors each having a command sending unit and a command receiving unit operating independently of each other, said system comprising:
    a single control unit connected to said processors;
    individual sending paths between the command sending unit of each processor and said control unit, respectively;
    individual receiving paths between the command receiving unit of each processor and said control unit, respectively;
    wherein said single control unit including:
        first means for selecting, in a predetermined priority order, a sending path of a sending processor generating a command transfer request signal;
        second means for selecting a receiving path of a receiving processor;
        third means, connected to said first means, for storing a sending processor address of the sending processor;
        fourth means for receiving a receiving processor address from the selected sending processor;
        fifth means, connected to said fourth means, for checking whether the received receiving processor address is one of a normal processor address and an abnormal processor address;
        sixth means, connected to said fourth and fifth means, for checking a status of the receiving processor when the received receiving processor address is a normal processor address;
        seventh means, connected to said first, second, third, fourth, and sixth means, for transferring the stored sending processor address to the receiving unit of the receiving processor when the receiving processor is available to receive commands;
        eighth means, connected to said second, third, fourth and fifth means, for sending the received receiving processor address to the receiving unit of the sending processor when the received receiving processor address is abnormal; and
        ninth means, connected to said second, third and sixth means, for generating an abnormal processor address representing the status of the receiving processor and sending the generated processor address to the receiving unit of the sending processor when the receiving processor is not available to receive commands.

2. A multiprocessor system comprising:
    a first processor producing a receiving processor address and a command;

a second processor;

a single transfer control means, connected to said first and second processors, for returning the receiving processor address to said first processor when the receiving processor address is invalid, returning an invalid address to said first processor when said second processor is not capable of executing the command, and connecting said first and second processors to each other for transferring the command when the receiving processor address is the address of said second processor and said second processor is capable of executing the command, said transfer control means comprising:

a receiving multiplexer connected to said first and second processors;

a sending multiplexer connected to said first and second processors and said receiving multiplexer; and a control circuit, connected to said first and second processors, determining the status of said first and second processors, checking the validity of the receiving processor address, sending the invalid address to said first processor through said sending multiplexer when the receiving processor address is invalid and when the receiving processor is in an abnormal state, and connecting said first and second processors to each other through said sending and receiving multiplexers when the receiving address is valid and the receiving processor is in a normal state.

3. A system for controlling transfer of commands between processors according to claim 1, wherein said seventh means further connecting the selected sending path of the sending processor and the receiving path of the receiving processor and establishing an information transfer path between the sending and the receiving processors.

4. A system for controlling transfer of commands between processors according to claim 3, wherein:

each said command receiving unit includes response sending means for sending response information;

each said command sending unit includes means for receiving the response information; and said system further includes a multiplexer for switching between the command sending paths of the command sending units and the response sending means of the command receiving units and performing a transmission of the response information in the same manner as the transmission of commands by switching the multiplexer from the command sending unit to the response sending means of the receiving unit in the receiving processor.

5. A system for controlling transfer of commands between processors according to claim 1, wherein said processor address has an additional bit in addition to address bits request to count the total number of processors connectable to the system, and said fifth means checking the received receiving processor address by checking the value of the additional bit of said processor address.

6. A system for controlling transfer of commands between processors according to claim 5, wherein said ninth means generating the abnormal processor address by changing the value of the additional bit of the receiving processor address to a specific value.

* * * * *

UNITED STATES PATENT AND TRADEMARK OFFICE
CERTIFICATE OF CORRECTION

PATENT NO. : 4,852,021

DATED : July 25, 1989

INVENTOR(S) : Aiichiro Inoue et al.

It is certified that error appears in the above-identified patent and that said Letters Patent is hereby corrected as shown below:

Col. 8, line 20, change "operating" to --operable--;

Col. 10, line 23, change "request" to --required--.

Signed and Sealed this

Fifth Day of June, 1990

Attest:

HARRY F. MANBECK, JR.

*Attesting Officer*  *Commissioner of Patents and Trademarks*